United States Patent [19]

Frioux et al.

[11] Patent Number: 4,650,388
[45] Date of Patent: Mar. 17, 1987

[54] DISCONNECTABLE COUPLING DEVICE FOR A MANIPULATOR WRIST

[75] Inventors: Christian Frioux; Charles Glachet; Daniel Francois, all of Vendorne; Jean Tentelier, Morée, all of France

[73] Assignees: La Calhene S.A., Bezons; Commissariat a l'Energie Atomique, Paris, both of France

[21] Appl. No.: 532,729

[22] Filed: Sep. 15, 1983

[30] Foreign Application Priority Data

Sep. 20, 1982 [FR] France .................... 82 15790

[51] Int. Cl.$^4$ ................................ B25J 3/00
[52] U.S. Cl. .......................... 414/1; 414/729; 403/322; 403/330; 901/31; 901/41
[58] Field of Search ............ 414/729, 732, 723, 1; 901/29, 30, 31, 50, 41; 403/330, 322; 292/DIG. 49, 216

[56] References Cited

U.S. PATENT DOCUMENTS

| | | | |
|---|---|---|---|
| 3,543,592 | 12/1970 | Haaker et al. | 901/29 X |
| 4,068,536 | 1/1978 | Stackhouse | 901/29 X |
| 4,370,091 | 1/1983 | Gagliardi | 901/29 X |
| 4,436,477 | 3/1984 | Lenertz et al. | 414/723 |

FOREIGN PATENT DOCUMENTS

| | | | |
|---|---|---|---|
| 2093518 | 9/1982 | United Kingdom . | |
| 2097754 | 10/1982 | United Kingdom | 901/29 |

*Primary Examiner*—Robert J. Spar
*Assistant Examiner*—Jonathan D. Holmes
*Attorney, Agent, or Firm*—Pearne, Gordon, McCoy, & Granger

[57] ABSTRACT

A device for the disconnectable coupling of a support toggle joint of a gripper to the end of a slave arm of a remote manipulator. The arm and toggle joint each have a case in which are located means for transmitting movements to the gripper. The coupling device comprises at least two latches pivotably mounted on one of the cases and which are able to occupy a coupling position in which they bear against pins fixed to the other case. This couples the toggle joint to the end of the arm and the latches can also occupy a position in which they are disengaged from the pins in order to disconnect the toggle joint. The retractable locking means normally immobilizes the latches with respect to the case supporting them when the latches occupy the coupling position. The invention also provides a disconnection support for the coupling device.

6 Claims, 5 Drawing Figures

DISCONNECTABLE COUPLING DEVICE FOR A MANIPULATOR WRIST

BACKGROUND OF THE INVENTION

The present invention relates to a device for the disconnectable coupling of a support toggle or knuckle joint of a gripping member to the end of a slave arm of a remote manipulator, as well as to a disconnection support for receiving the toggle or knuckle joint and its gripping member, in order to automatically ensure the remote connection and disconnection of the coupling device connecting the toggle or knuckle joint to the slave arm.

In order to carry out manipulations within a cell having to be insulated from the external atmosphere, particularly because the medium contained in the cell is a toxic or dangerous medium such as a radioactive medium, it is conventional practice to use various remote manipulation or handling means, which include so-called masterslave manipulators. These manipulators comprise, outside the cell, an articulated and/or telescopic master arm carrying a control handle at its end and, within the cell, a slave arm which is identical or similar to the master arm and carries at its end, via a toggle joint, a gripping member usually constituted by a claw.

In such remote manipulators, mechanical or electrical means are provided so that an identical or similar movement of the slave arm corresponds to any movement carried out on the master arm by an operator. Moreover, the control handle is equipped with an actuating member such as a trigger making it possible to control, via mechanical or electrical means, the closing of the gripping claw or gripper, whilst its opening can be controlled in the same way, or can be carried out automatically with the aid of elastic means incorporated into the gripper.

For example, the transmission of different movements between the master arm and the slave arm can be carried out in particular by means of straps or cables winding onto pulleys and whose displacements are controlled by capstans.

It is clear that master-slave manipulators constitute complex mechanisms periodically requiring interventions, in order to change certain parts. When the parts are on the side of the master arm, no special problem is linked therewith. However, any intervention which has to be carried out in connection with the slave arm involves a very precise process made necessary by the need to preserve the confinement of the cell and by the contamination of certain parts when working in a radioactive atmosphere. In order to take account of the latter requirement, the slave arm is generally disposed within a protective sleeve limiting its contamination, whereas the toggle joint and gripper are placed within the enclosure without any protection.

Consideration has been given to the separation of the toggle joint - gripper assembly from the reset of the slave arm in order to give a different treatment in connection with the highly contaminated parts (toggle joints and gripper) as compared with that required for the slightly contaminated parts (segments of the slave arm). Thus, when the intervention is to take place on the toggle joint or gripper, the disconnection of this relatively small assembly makes it possible to transport it in a lead transporting casket to an appropriate intervention cell, where it is treated without any risk of contamination. However, when the intervention relates to the actual arm and as is frequently the case, the disconnection of the toggle joint - gripper assembly makes it possible to leave these contaminated parts on a support within the cell whereas the slave arm, protected by its sleeve, is removed on the master arm side using a process well known in the art.

In the presently existing installations having such a disconnectable coupling device by which the toggle joint is fixed to the end of the slave arm, said device is a bayonet device making it necessary to rotate with respect to the arm, a ring carried by the toggle joint, the direction being a function of whether connection or disconnection thereof is to take place.

Although this device functions satisfactorily, it has the disadvantage of requiring the presence of a second manipulator or at least one motor member, such as a jack within the cell, in order to control the rotation of the toggle joint. This is not satisfactory, because it is obvious that the presence of this second manipulator is highly prejudicial with regards to the costs and overall dimensions of the cell. In addition, recourse to a back-up motor means such as a jack is not satisfactory, because it increases the risk connected with intervening within the cell for repairing a defective part. Moreover, if the motor means fails, it is not possible for the operator to connect or disconnect the coupling device. It also increases the number of passages through the cell wall necessary for controlling the motor means from the outside, which is prejudicial from the confinement and cost standpoints.

SUMMARY OF THE INVENTION

The present invention relates to a particularly simple disconnectable coupling device not suffering from the disadvantages of the known device. Thus, the device according to the invention makes it possible to connect or disconnect the toggle joint without it being necessary to have recourse to another manipulator or to a back-up motor, even in the case where the control means of the different movements of the gripper and the azimuthal movement are out of use.

The present invention therefore proposes, a device for the disconnectable coupling of a support toggle joint of a gripper to the end of a slave arm of a remote manipulator, said arm and said toggle joint each having a case in which are located means for transmitting movements to the gripper, wherein said coupling device comprises at least two latches pivotably mounted on one of the cases and which are able to occupy a coupling position in which they bear against pins fixed to the other case, so as to couple the toggle joint to the end of the arm and can also occupy a position in which they are disengaged from said pins in order to disconnect the toggle joint, whereby retractable locking means normally immobilize the latches with respect to the case supporting them, when said latches occupy the said coupling position.

As a result of the aforementioned arrangement, connection and disconnection of the toggle joint can be obtained by simply tilting the latches. It is obvious that this tilting and the overriding of the retractable locking means can be obtained with the aid of a disconnection support having abutment surfaces in order to ensure the tilting of the latches and the arms in order to retract the locking means, without it being necessary to have a motor means or a second manipulator within the cell.

According to a preferred embodiment of the invention, the latches are mounted on the toggle joint case and the pins are fixed to the arm case.

In order to further increase the simplicity and low cost of the coupling device according to the invention, when the means for transmitting movements located in the case of the arm are of the chain or strap type, each of the latter is received at the end of the arm on a toothed wheel or a pulley fixed to a pinion engaging on a corresponding pinion located in the case of the toggle joint.

Preferably, the locking means comprise retractable rods carried by the case supporting the latches and drawn by elastic means into holes formed in the latches and positioned facing said rods when the latches occupy said coupling position.

The invention also relates to a disconnection support of the aforementioned coupling device.

According to the invention, this support comprises a toggle joint support block carrying the toggle joint positioning means, and at least two parts which can be moved between a connection position and a disconnection position by means of a lever, said parts having abutment surfaces able to cooperate with the latches of the coupling device in order to displace the latter towards the coupling position when it is wished to remove the toggle joint from the support and said parts are in the connection position, and towards the reverse position when the toggle joint is introduced into the support and the parts are in the disconnection position, the support also having means for retracting the locking means when the toggle joint is in the support.

According to another feature of the invention, said parts and the lever are mounted in pivotable manner on the toggle joint support block, the lever carrying at least two cams against which the said parts are held by elastic means, in such a way that the parts either occupy the connection position, or the disconnection position, as a function of the position occupied by the lever. In order to permit the manipulation of this lever, even if the gripper movement controls fail, the parts occupy the disconnection position when the lever is in the upper position and the connection position when the lever is in the lower position.

According to yet another feature of the invention, the positioning means also have slots receiving the pins formed on the toggle joint.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

Figure 1:
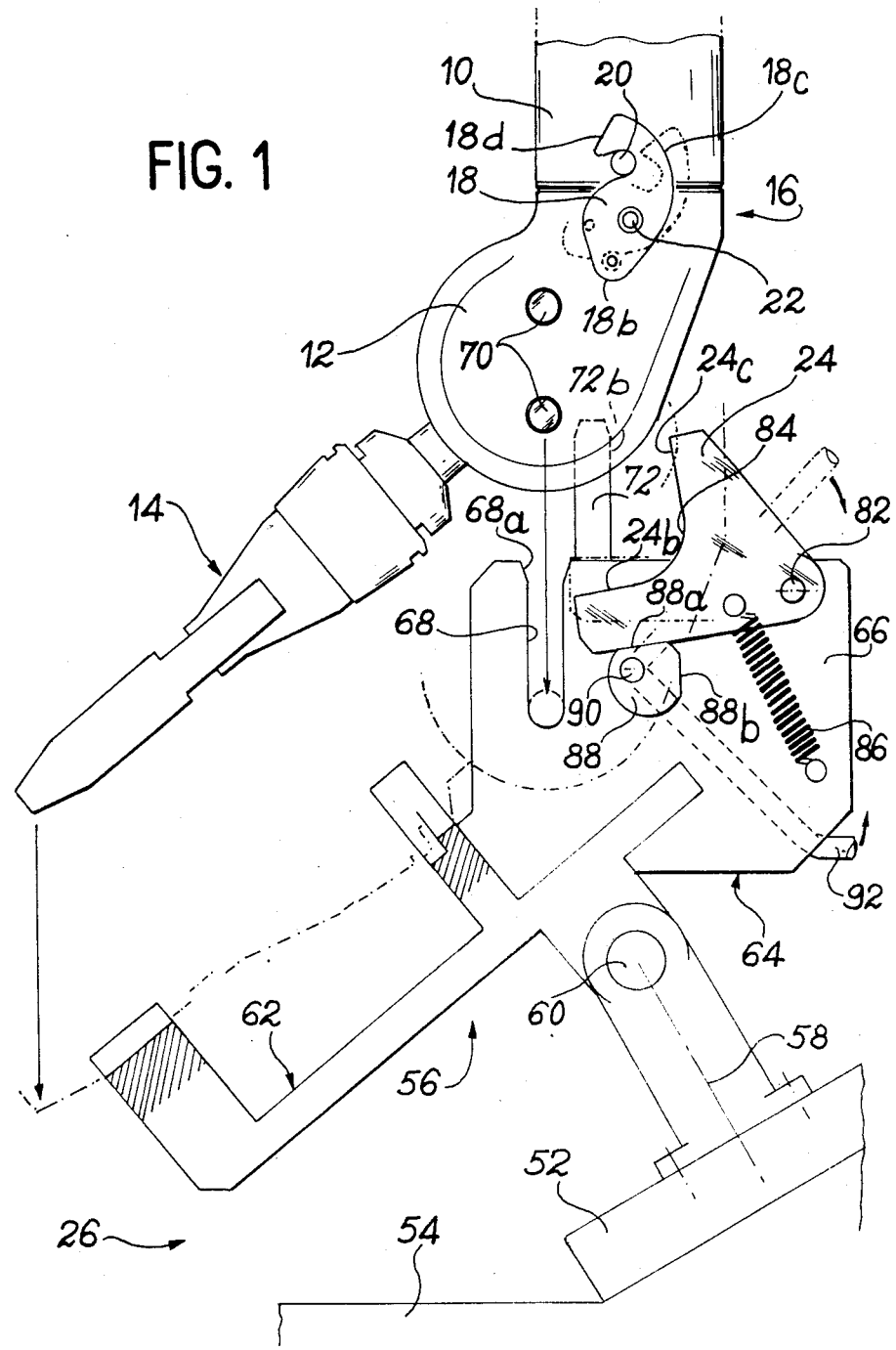
FIG. 1 a side view showing the lower end of the slave arm of a remote manipulator carrying a gripper via a toggle joint fixed to the end of the arm with the aid of a coupling device according to the invention, the toggle joint and gripper being ready for introduction into an appropriate disconnection support also constructed according to the teachings of the invention.

On referring to FIG. 1, it is possible to see the end of the slave arm 10 of a random known type of master-slave manipulator. As stated hereinbefore, said slave arm can either be articulated, or telescopic. At the end of arm 10 is carried a toggle or knuckle joint 12, which both supports and orients a gripper 14, which can be constituted by any known gripping member making it possible to perform the envisaged operation. In per se known manner, toggle joint 12 makes it possible to pivot gripper 14 about an axis perpendicular to the axis of arm 10 (gripper lifting movement), about its own axis (gripper rotation movement), whilst also transmitting the gripper fastening movement.

According to the invention, toggle joint 12 is fixed to the end of the slave arm 10 by means of a disconnectable coupling device 16.

Figure 2:
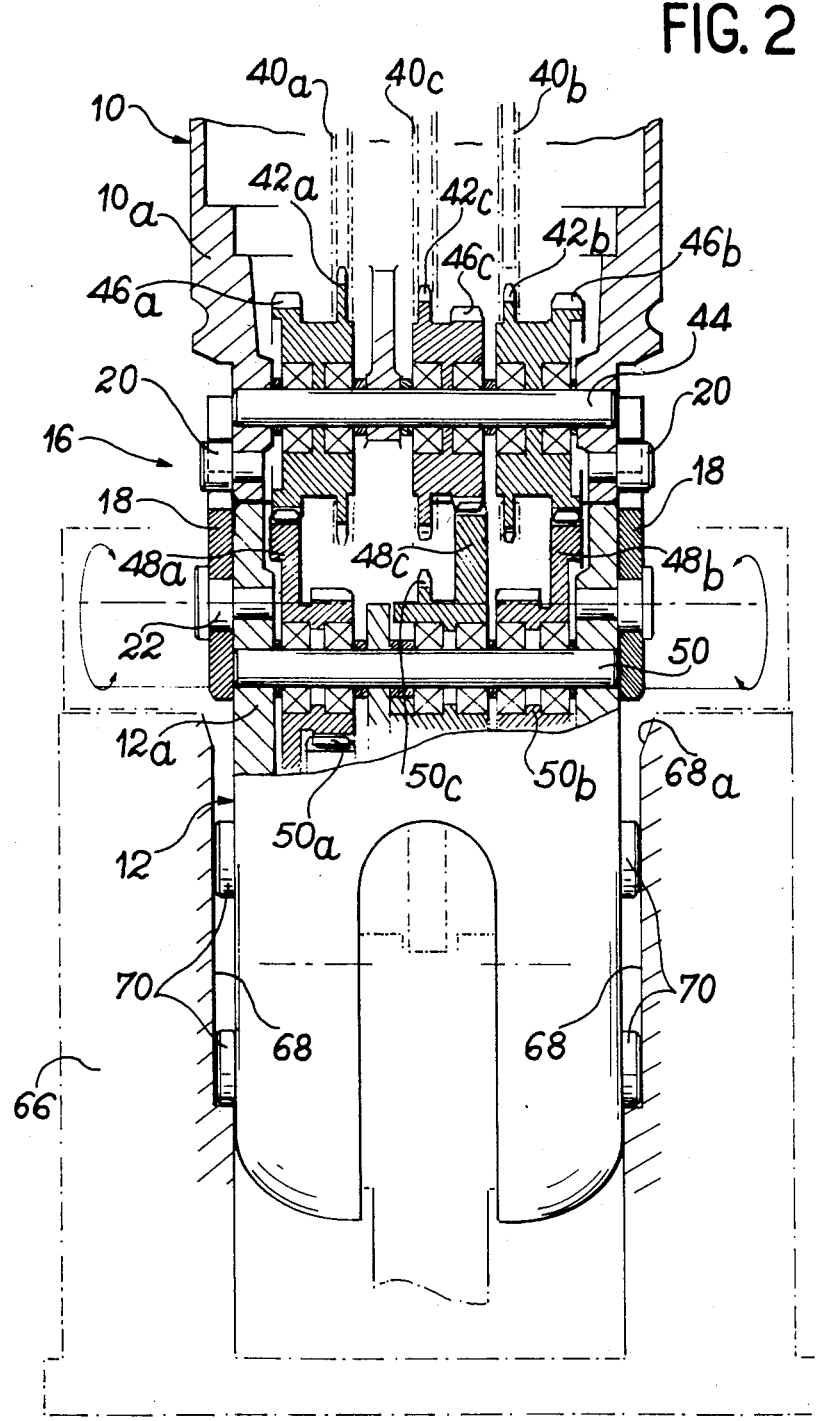
FIG. 2 a front view, in larger scale longitudinal sectional form of the disconnectable coupling device according to the invention.

It can be seen from FIG. 2 that this coupling device 16 comprises two latches 18 mounted in pivotable manner outside the case 12a of the toggle joint and two pins 20 fixed to the case 10a of the lower segment of slave arm 10, so as to project outside said case. More specifically and as is more particularly shown in FIGS. 1 to 3, each of the latches 18 is constituted by a metal sheet, cut so as to have a hook-like opening 18a and able to cover the corresponding pin 20, so as to form an abutment maintaining the case 12a of the toggle joint against case 10a of the last segment of the slave arm, in order to ensure the connection of these two parts in the manner illustrated in FIG. 1.

Preferably and as illustrated in FIG. 2, latches 18 are mounted on the planar, parallel, lateral faces of the toggle joint case 12a about two coaxial pivoting spindles 22, so that the plane defined by the plates constituting the latches 18 are parallel to one another. Obviously, pins 20 are then also positioned on either side of case 10a and are also disposed in the extension of one another, i.e. coaxially when they have a circular cross-section, as shown in the drawing.

As will be shown hereinafter, the shape of the latches 18 is designed so as to permit the automatic control of the pivoting of these latches about their spindles 22 by cooperating with parts 24 of a support 26 for receiving gripper 14 and its toggle joint 12. However, it is also necessary to ensure that such a pivoting of latches 18 does not occur accidentally during a manipulation and does not lead to the disconnection of device 16 with all the resulting prejudicial consequences. Therefore, coupling device 16 is equipped with locking means, which normally maintain latches 18 in the coupling position of toggle joint 12 and arm 10, shown by continuous lines in FIG. 1. In order to permit an automatic dismantling of coupling device 16 during the introduction of the toggle joint and the gripper into support 26, it is also necessary for these locking means to be retractable.

Figure 3:
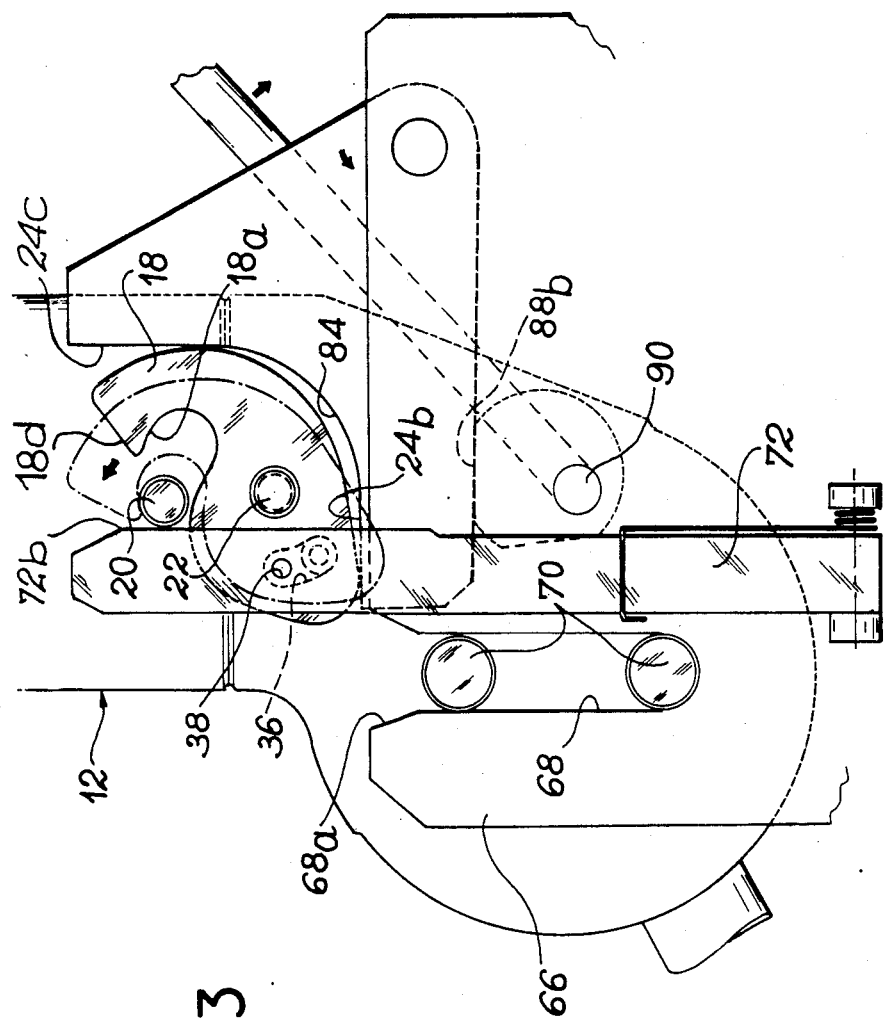
FIG. 3 a larger scale, side view of the toggle joint and the corresponding part of the disconnection support, when the toggle joint has been introduced into the support.
Figures 4, 5:
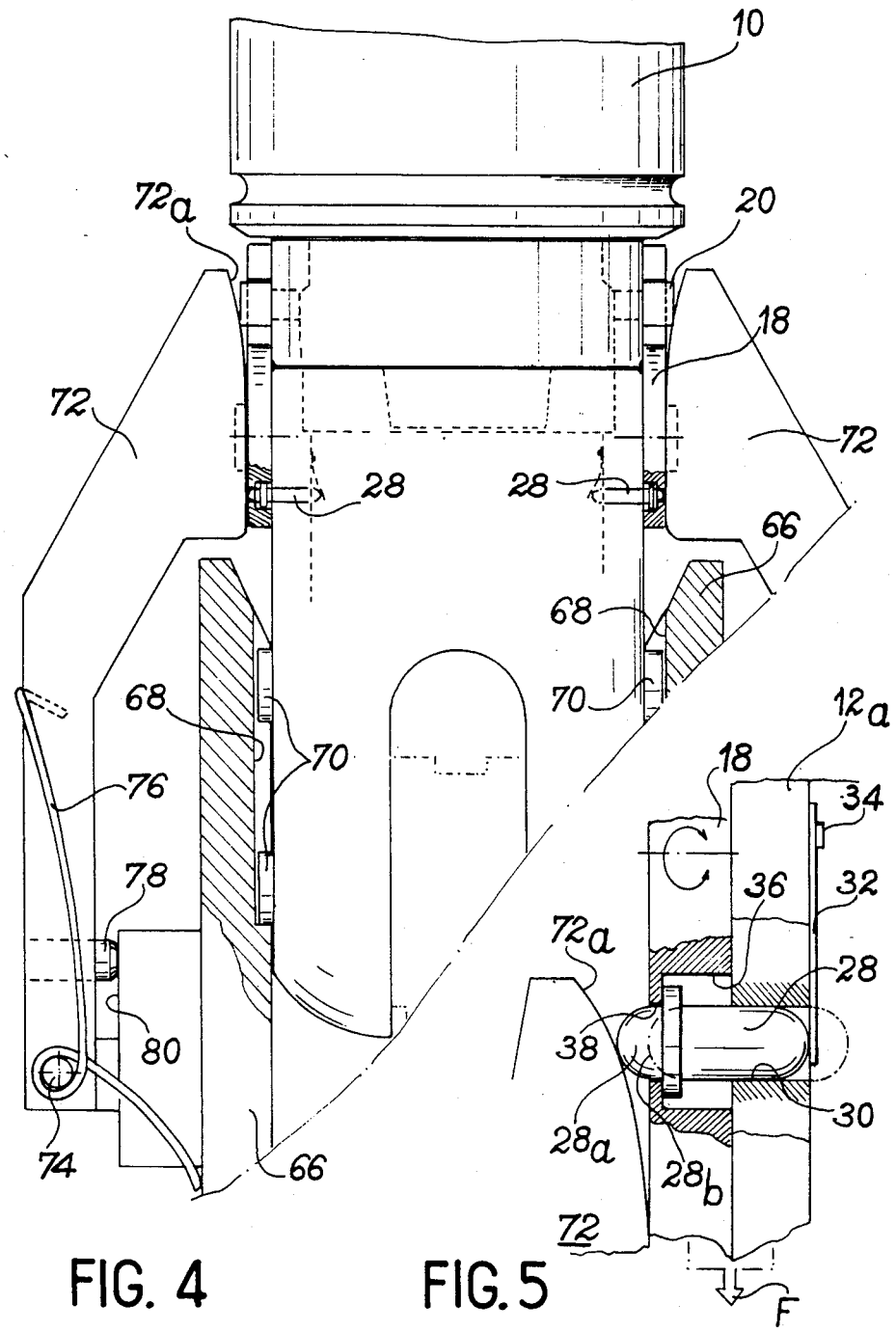
FIG. 4 a view comparable to that of FIG. 2 showing the arms of the disconnection support used for disconnecting the locking rods of the latches of the coupling device.
FIG. 5 a larger scale view showing the retractable rods and the arms of the support used for overriding them.

To this end and as is more specifically shown in FIG. 5, these locking means comprise, for each of the latches 18, a retractable rod 28 able to slide parallel to the pivoting spindle or hinge pin 22 into a bore 30 of the toggle joint case 12a. By means of a leaf spring 32, fixed at 34 within the toggle joint case 12a, rod 28 is elastically drawn into a circular arc-shaped groove 36 formed on the inner face of latch 18, so as to permit its pivoting about spindle 22, in the manner illustrated in FIG. 3.

It can be seen in FIGS. 3 and 5 that each latch 18 also has a hole 38, which traverses the wall defined between the bottom of groove 36 and the outer face of the latch, so as to permit the passage of the curved end 28a of rod 28, when the latch occupies the connection position shown in continuous line form in FIG. 1. A collar 28b of rod 28 bars against the bottom of groove 36, as shown in FIG. 5.

In this position, it is important to note that the part of end 28a of the rod located in hole 38 is substantially cylindrical, whereas the curved end projects beyond the outer face of the latch. As a result of this feature, it is clear that any movement tending to rotate the latch about its spindle 22 is prevented by the cylindrical part of end 28a bearing against the inner face of hole 38. Conversely, it is obvious that it is merely necessary to override pins 28 in opposition to the tension exerted by spring 32 until the curved end 28a is flush with the outer face of latch 18 to ensure that pivoting of the latches is made impossible. Thus, the length of the curved parts exceeds the length of hole 38.

In order to permit the control of the pivoting of latches 18 with the aid of parts 24 of support 26, mention was made hereinbefore of the fact that it was desirable to give a special shape to the latch. Thus, and as is illustrated more particularly in FIGS. 1 and 3, each of the latches 18 has on the side opposite to the hook-shaped recess 18a with respect to spindle 22, a cam surface 18b able to rotate latch 18 in the direction permitting the disengagement of recess 18a and pin 20 (i.e. in the clockwise direction with respect to FIGS. 1 and 3), when surface 18b bears against an appropriate abutment surface, such as a surface 24b formed on the corresponding part 24 of the support. This result is obtained through the fact that the cam surface 18b is formed in the lower part of the latch and on the opening side of the hook-shaped recess 18a, with respect to the plane joining the geometrical axes of spindle 22 and the corresponding pin 20.

In a comparable manner, the outer face of that part of latch 18 in which is formed recess 18a constitutes a cam surface 18b able to pivot the latch about its spindle 22 in the direction making it possible to bring recess 18a onto pin 20 (i.e. in the counterclockwise direction with reference to FIGS. 1 and 3), when said surface 18c abuts against an appropriate abutment surface such as 24c formed on the corresponding part 24 of the support.

To complete the description of the coupling device 16, reference will again be made to FIG. 2 showing the means making it possible to connect the mechanisms for transmitting the movements of the gripper. As stated hereinbefore, there are three such movements in the represented embodiment, namely the movement of raising the gripper about an axis normal to the arm axis, the movement of rotating the gripper about its own axis and the movement of fixing the gripper, the release movement being carried out automatically with the aid of one or more springs directly located in the gripper.

The transmission of these three movements within case 10a can be more particularly carried out with the aid of three chains 40a, 40b, 40c received at the lower end of arm 10 on three toothed wheels 42a, 42b, 42c, mounted in rotary manner on a same shaft 44 carried by case 10a. Each of the toothed wheels 42a, 42b, 42c is fixed to a pinion 46a, 46b, 46c able to engage in a corresponding pinion 48a, 48b, 48c mounted in rotary manner on the same shaft 50 carried by the toggle joint case 12a. The two outer pinions 48a, 48b are themselves fixed to a pinion 50a, 50b respectively, whereas the central pinion 48c is integral with a toothed wheel 50c, on which is received a not shown chain used for controlling the closing of the gripper. Pinions 50a, 50b mesh in per se known manner with other not shown pinions, in such a way that the rotation in the same direction of pinions 50a and 50b controls the gripper raising movement, whereas the rotation of these pinions in the opposite direction controls the gripper rotation movement.

The above description shows that the coupling of the movement transmission means with respect to device 16 is carried out in the same way for each of the movements to be transmitted and in a particularly simple manner, because it is obtained by merely meshing two pinions for each movement. Thus, it is possible, in the manner shown in FIG. 2, to accurately locate the joint surface in the immediate vicinity of the ends of cases 10a and 12a.

A description will now be given, with more specific reference to FIGS. 1, 3 and 4 of the disconnection support for receiving toggle joint 12 and gripper 14, when the manipulator is equipped with the coupling device 16 according to the invention.

With reference to FIG. 1, it can firstly be seen that support 26 has a base plate 52, which can be placed or fixed at any appropriate point within the enclosure and more particularly on the partition 54 thereof. The actual support part 56 is mounted on base plate 52, so that it can be oriented at random, e.g. about an axis 58 perpendicular to the base plate and about a spindle 60 orthogonal to axis 58. The support part 56 firstly has in per se known manner, a gripper support block 62 adapted to the shape of gripper 14, such that it can support the latter in the reference position identical to that defined on the pinned master toggle joint.

According to the invention, part 56 also has, to the rear of support block 62, a toggle joint support block 64 having two parallel vertical plates 66 (FIGS. 2 and 4). It can more particularly be seen in FIGS. 1 to 4 that plates 66 are to be positioned on either side of toggle joint 12 and perfectly position the latter in order to ensure the satisfctory operation of the means making it possible to connect and disconnect the coupling device 16 and means permitting the retraction of rods 28. To this end, the spacing between the plates slightly exceeds the thickness of the toggle joint between its planar lateral faces. Moreover, each of the plates 66 has on its inner face a vertical groove 68, in which are successively located two pins 70, formed on each of the lateral faces of the toggle joint case. In order to facilitate positioning, FIGS. 1 to 3 show that the grooves 68 are slightly widened at 68a at their upper ends.

The toggle joint support block 64 also has means for automatically overriding rods 28, in such a way that their curved ends 28a are flush with the outer face of the corresponding latch 18, when the toggle joint is received in the support block. It can be seen from FIGS. 3 to 5 that these means are constituted by two arms 72, which are mounted on the outer faces of plates 66, so as to be able to pivot about two horizontal axes 74 parallel to plates 66. A torsion spring 76 simultaneously bearing on plate 66 and the corresponding arm 72 brings about the engagement of the end of the latter with the outer face of the corresponding latch 18, when toggle joint 12 is received in the support. More specifically, arms 72 are then positioned facing the retractable rods 28 and the force exerted by springs 76 significantly exceeds the force exerted by leaf spring 32, in such a way that rods 28 are retracted and their curved end 28a is flush with the outer face of the corresponding latch 18, thus permitting the rotation of the latter.

When toggle joint 12 has still not been introduced into support block 64, abutments 78 fixed to arm 72 bear against the abutment surfaces 80 formed on plate 66, so as to limit the travel of arm 72. Moreover, the surfaces of the arms bearing on the latches are widened at 72a at their upper end. Thus, during the introduction of toggle joint 12 (arrow F in FIG. 5), the arms 72 progressively override rods 28 in order to move them from the locking position shown in continuous line form in FIG. 5 into the retracted position shown in mixed line form.

According to the invention, the toggle joint support block 64 is also provided with simple means able to occupy two positions making it possible to automatically bring about the disconnection of the coupling device 16 on introducing the toggle joint and the gripper into the support, or conversely the connection of the coupling device on seeking the gripper and the toggle joint with the aid of an appropriate slave arm 10.

As briefly stated hereinbefore, at the end of the description of the coupling device, these means essentially comprise two parts 24 mounted in pivotable manner on the inner faces of plate 66 about two coaxially arranged spindles or hinge pins 82. Parts 24 are formed by parallel planar plates having at the opposite end to hinge pin 82 a rounded V-shaped discontinuity 84, in which is placed the corresponding latch 18. More specifically, the two substantially rectilinear branches at 90° from discontinuity 84 respectively define the abutment surfaces 24b and 24c able to bear against the cam surfaces 18b, 18c of latches 18.

The two parts 24 are drawn downwards about their spindles 82 by a draw spring 26, whose ends are fixed by the rods respectively to parts 24 and plates 66. Thus, each of the parts 24 is made to bear against a cam 44, mounted in rotary manner on the corresponding plates 66 by a spindle 90. More specifically, each of the cams 88 has two planar surfaces 88a, 88b, which are angularly displaced with respect to one another and are disposed at a different distance from spindle 90, in such a way that the position of the pivoting parts 24 about their spindles 82 differs as a function of whether these parts bear against surfaces 88a or 88b under the action of spring 86. A relatively large lever 92 is fixed to cams 88, in order to permit the control of the rotation thereof about spindles 90.

On referring to FIG. 3, it can be seen that when lever 92 is in the upper position, parts 24 bear against surface 88b of the cam furthest from spindle 90. The lower branch 24b of recess 84 is then in the upper position and is virtually horizontal. Conversely, the upper branch 24c of recess 84 is virtually vertical. This position corresponds to the introduction of toggle joint 12 and gripper 14 into the support and makes it possible to automatically control the disconnection of device 16, as illustrated in FIG. 3.

Thus, and as is apparent from the drawing, the substantially horizontal position of surface 24b makes it possible to abut against surface 18b of the latch, before the toggle joint is completely introduced into its support. This contact between surfaces 18b and 24b rotates the latch in the clockwise direction with respect to FIG. 3. Bearing in mind the substantially vertical position of surface 24c, this pivoting of the latch is not prevented by this surface. It is clear that when the toggle joint is completely engaged in its support block 64, the hook-shaped recess 18a formed in the latches is disengaged from the pins 20, in such a way that the coupling device 16 is disconnected and arm 10, which is free from the toggle joint and the gripper, can be disengaged. Obviously, it is then possible for latches 18 to pivot, because arms 72 have overridden rods 28 within the latches.

Conversely, and as is shown in FIG. 1, when lever 92 is in the lower position, parts 24 bear against surfaces 88a closest to spindles 90. Surfaces 24b and 24c of recess 85 are then inclined by a certain angle in the counterclockwise direction, with respect to the position illustrated in FIG. 3. In particular, the upper end of surface 24c then overhangs with respect to the lower end of said surface.

This position makes it possible to ensure the automatic disconnection of coupling device 60 on seeking toggle joint 12 and its gripper 14 with the aid of an appropriate arm. It should be borne in mind that the latches 18 occupy the position shown in continuous line form in FIG. 3 following the introduction of the toggle joint into its support. The first effect of tilting lever 92 is to bring about the pivoting of latches 18 in a counterclockwise direction (FIG. 1) as a result of the cooperation of surface 24c with cam surface 18c. This pivoting does not prevent the abutting of the case of arm 10 against that of the toggle joint.

When arm 10 continues to drop, pins 20 bear against edges 72b of arm 72 facing surface 24c. Simultaneously, they bear against the inclined edges 18b formed at the upper end of each of the latches 18, so as to bring about the tilting of the latter in the clockwise direction. This movement is possible as a result of the presence of return springs 86 of parts 24.

When the cases of arm 10 and toggle joint 12 are in contact, pins 20 face recesses 18a of the latches and parts 24 act by their surfaces 24c in order to move the latches into the locking position.

The removal of the toggle joint then takes place by raising arm 10, which has the effect of reinforcing the locking as a result of the sliding of cam surface 18c on surface 24c. This operation is terminated by the automatic locking of the coupling device through rods 28 being brought into a position facing holes 38 and through rods 28 then being disengaged from arms 72.

To complete the description, it should be noted that in accordance with the essential aim of the invention, lever 92 can be manipulated without it being necessary to call on a second manipulator or some other motor means. Thus, before introducing the toggle joint and its gripper into the support, it is easy for the operator to push lever 92 with the gripper, even in the case when the manipulator has significant faults and particularly when all the movements of the gripper (raising, rotation, fastening and azimuth, i.e. rotation of the assembly about the arm axis) are made impossible for any reason. Thus, lever 92 can always be placed in the upper position in order to ensure automatic disconnection, during the introduction of the toggle joint into the support. In the same way, when the operator seeks the toggle joint with the aid of a bare arm, by means of the end of said arm he can bear on lever 92 in order to tilt it into the lower position and this involves no difficulty.

Obviously, the invention is not limited to the embodiment described hereinbefore and in fact covers the variants defined by the claims. In particular, it is clear that the movement transmission means can differ from those described and can in particular be constituted by straps or cables without passing beyond the scope of the invention. Moreover, the latches and pins corresponding thereto, as well as the parts of the support ensuring the tilting of the latches can be in a greater number than two, although the aforementioned construction is clearly simpler. The arrangement of the latches and pins respectively on the toggle joint could also be reversed. However, the configuration of the disconnection support would be made more complicated. Finally, the locking of latches 18 could be controlled by any means other than those described. In particular, it would be possible to use the gripper closing control, which becomes operative as soon as the toggle joint and arm cases are in contact, in order to tilt parts 24 (e.g. by means of cables or any other similar device connecting the jaws of the gripper to said parts), in order to lock latches 18.

What is claimed is:

1. A device for the disconnectable coupling of a support toggle joint of a gripper to the end of a slave arm of a remote manipulator, said arm and said toggle joint each having a case in which are located means for transmitting movements to the gripper, wherein said coupling device comprises at least two latches pivotably mounted on one of the cases and which are able to occupy a coupling position in which they bear against pins fixed to the other case, so as to couple the toggle joint to the end of the arm and can also occupy a position in which they are disengaged from said pins in order to disconnect the toggle joint, whereby retractable locking means normally immobilize the latches with respect to the case supporting them, when said latches occupy the said coupling position, said device further including a disconnection support for the coupling device said support comprising a toggle joint support block carrying the toggle joint positioning means, and at least two parts which can be moved between a connection position and a disconnection position by means of a lever, said parts having abutment surfaces able to cooperate with the latches of the coupling device in order to displace the latter towards the coupling position when it is wished to remove the toggle joint from the support and said parts are in the connection position, and towards the reverse position when the toggle joint is introduced into the support and the parts are in the disconnection position, the support also having means for retracting the locking means when the toggle joint is in the support.

2. A support according to claim 1, wherein the means for retracting the locking means comprise arms made to bear against the latches by elastic means, so as to bring a curved end of the retractable rod into the holes formed in the latches, in such a way that the latter can then rotate freely with respect to the case supporting them.

3. A support according to claim 1, wherein the parts and the lever are mounted in pivotable manner on the toggle joint support block, the lever carrying at least two cams against which the parts are made to bear by elastic means, in such a way that these parts occupy either the connection position, or the disconnection position, as a function of the position occupied by the lever.

4. A support according to claim 3, wherein these parts occupy the disconnection position when the lever is in the upper position and the connection position when the lever is in the lower position.

5. A support according to claim 1, wherein the positioning means comprise slots in which are received the pins formed on the toggle joint.

6. A support according to claim 1, wherein the abutment surfaces are formed by two substantially rectilinear branches of a V-shaped discontinuity formed in each of said parts.

* * * * *